United States Patent [19]

Miller

[11] 4,339,977
[45] Jul. 20, 1982

[54] BLADE RECIPROCATING SAWS

[76] Inventor: Jack V. Miller, 1917 E. Villa St., Pasadena, Calif. 91107

[21] Appl. No.: 114,215

[22] Filed: Jan. 22, 1980

[51] Int. Cl.³ .................. B23D 57/00; B27B 33/02
[52] U.S. Cl. .................................. 83/848; 83/851; 145/31 R; 145/33 R
[58] Field of Search ............... 145/32 R, 31 R, 32 A, 145/32 B, 33 R, 33 A, 33 AB, 33 B, 33 E, 31 AB, 31 AC, 31 AD, 130; 83/846, 848, 851, 837, 835

[56] References Cited

U.S. PATENT DOCUMENTS

| Re. 3,566 | 7/1869 | Boynton | 83/848 |
|---|---|---|---|
| 85,417 | 12/1868 | Andrews | 83/846 |
| 295,967 | 4/1884 | Abbott | 83/835 |
| 566,865 | 9/1896 | Morrish | 83/846 |
| 1,497,577 | 6/1924 | Morzsa | 145/31 R |
| 2,682,098 | 6/1954 | Wilcox | 83/848 |

FOREIGN PATENT DOCUMENTS 162792  8/1953  Australia .............................. 83/846

Primary Examiner—Nicholas P. Godici
Assistant Examiner—J. T. Zatarga
Attorney, Agent, or Firm—Wagner & Bachand

[57] ABSTRACT

A blade for a reciprocating saw having a cutting edge comprising a plurality of longitudinally aligned teeth, the improvement comprising the teeth having a negative rake angle near the leading end of the blade for reducing needed force for cutting at the beginning of a stroke, and a positive rake angle near the trailing end of the blade for increasing the force necessary for cutting to decelerate the saw during or at the of the stroke, whereby cutting actions are related to expected blade speed at any given point on the saw and relatively constant muscular effort is required over the length of a stroke.

7 Claims, 7 Drawing Figures

BLADE RECIPROCATING SAWS

BACKGROUND OF THE INVENTION

This invention has to do with saw blades. More particularly, the invention is concerned with an improvement in saw blades comprising a variation progressively in the rake angle of the teeth from negative to positive to enable faster initiation of the stroke on the one hand, and greater cutting albeit with greater resistance at the terminal end of a stroke whereby cutting effort is maintained relatively constant over a saw stroke.

In general, the invention pertains to blades employable in hand saws which are operated in a reciprocating manner. The blades for such saws are generally made with a negative rake, that is, the cutting surface of the tooth is slanted back for smooth cutting. A positive rake, one in which the cutting surface of the tooth is slanted forward is best adapted for rapid cutting. In general, the negative rake angle of a tooth is used for workpiece cutting cross-cut saws, the positive rake is used for rip-sawing wood or cutting very homogeneous materials. A positive rake is also advantageous in saws used for pruning, tree trimming and the sawing of wet wood.

Having a negative rake angle on the tooth enables a cross-cut saw to start easily and cut smoothly, but cutting efficiency is relatively poor. On the other hand, a positive rake angle tooth such as is provided in a rip-saw cuts very efficiently, but it is difficult to start a stroke and the teeth tend to stick in the kerf since the teeth tend to dig in to the workpiece at the initiation of the stroke. Such sticking causes buckling of the blades particularly in thin, push saws like keyhole saws, and in some instances tends to snap the blades in tension, on small pull saws like coping saws and jeweler's saws.

In presently known pruning saws of the pull type snagging of teeth is reduced by curving the blade so that the initial part of the stroke has reduced engagement force, nonetheless snagging is still present to a degree, and caused by the self-engagement tendency of the positive rake angle teeth of the saw.

SUMMARY OF THE INVENTION

It is a major objective of the present invention to provide a novel saw blade. It is a further object of the invention to provide a novel saw blade having a progressive change in rake angle of teeth from leading to trailing end. It is a further object of the invention to provide a saw which starts a cut more easily, cuts efficiently and ameliorates problems inherent in all types of saws by providing the optimum performance at any given position along the saw blade. It is a highly particular object of the invention to provide a saw blade for a reciprocating saw in which cutting effort is relatively constant over the length of the blade and the teeth are configured in such a manner as to cut easily for initiation, but to cut less easily at the end of the stroke when blade speed is highest whereby cutting efficiency and cutting ease are maximized over a given stroke.

In particular, the invention provides in a blade for a reciprocating saw having a cutting edge comprising a plurality of longitudinally aligned teeth, the improvement comprising the blade teeth having a negative rake angle near the leading end of the blade for reducing needed force for cutting at the beginning of a stroke, and a positive rake angle near the trailing end of the blade for increasing the force necessary for cutting to decelerate the saw during or at the end of the stroke, whereby cutting actions are related to expected blade speed at any given point on the saw and a relatively constant muscular effort is required over the length of a stoke. The rake angle of the first leading end tooth typically is not more than −3 degrees, and the rake angle of successive teeth changes progressively to not less than +5 degrees within the first half of the blade length. Thus in a preferred embodiment, the negative rake angle of the leading end tooth is not more than −3 degrees, the positive rake angle of the teeth on the trailing half of the blade is not less than +5 degrees, and the tooth-to-tooth progression in the positive rake direction is not greater than one degree. Additionally, the positive rake angle at the trailing end of the blade typically is greater than the positive rake angle at the midpoint of the blade.

In one embodiment of the invention each tooth has two points, the points being spaced by a notch; the blade preferably being generally symmetrical about its longitudinal midpoint, whereby the leading edges of the end teeth have a negative rake angle, for reduced effort stroking in either direction. In such embodiments the two pointed teeth may be separated by one or more single point teeth along the linear extent of the blade.

In a highly preferred embodiment of the invention, there is provided a blade for a reciprocating saw, the blade having a cutting edge comprising a plurality of longitudinally aligned teeth, the blade having first, second and third cutting zones; the first zone comprising 25% of the blade length, the second zone comprising the next 50% of the blade length, and the third zone comprising the remaining 25% of the blade length; the teeth in the first cutting zone having a negative rake angle, the teeth in the second cutting zone having a positive rake angle not less than 0 degrees and not greater than 10 degrees, and the teeth in the third cutting zone having a positive rake angle of more than 10 degrees, e.g. up to about 15 degrees. In another embodiment of the invention there is provided in a reciprocating saw blade having a cutting edge comprising a linear series of teeth, the improvement comprising the teeth having different rake angles varying from negative to positive with increasing blade speed in cutting at the tooth, whereby cutting effort progresses from easier to harder from leading blade portion to trailing blade portion on a cutting stroke.

BRIEF DESCRIPTION OF THE DRAWINGS

The invention will be fully described as to an illustrative embodiment thereof in conjunction with the attached drawings in which.

DESCRIPTION OF THE PREFERRED EMBODIMENTS

As will be evident from the foregoing, the present invention provides a hand saw blade in which the initial teeth at the leading end of the blade have a substantial negative rake, and the rake angle is gradually changed toward a positive rake angle within the first half of the blade, the remainder of the blade continuing with positive rake angle teeth. The length of the negative rake angle tooth portion of the blade depends on the overall blade length.

It has been determined that the greatest amount of sawing force is applied at the beginning of a saw stroke. This is due in part to the requirement that the mass of the saw itself be accelerated and in part to the necessity to overcome the "stiction" of the points of the teeth resting on the surfaces of the softer material being cut and embedding or self-engaging themselves in that material.

Once the saw begins to move and pick up velocity, both of the resistive forces of inertia and stiction are greatly diminished. The force peak at the beginning of the stroke is all the more fatiguing because applied muscle force encounters the static and the slow moving resistance of the saw. Therefore, a blade design which minimizes the cutting force at the beginning of the stroke, until blade velocity is achieved, results in a greatly reduced physical effort to produce efficient sawing.

The present invention achieves a nearly constant muscular effort by providing the leading end teeth with approximately a −5 degree rake angle, this rake angle gradually changing to a +10 degree rake within the first half of the blade length. A further embodiment of the invention provides an increased positive rake angle of up to 15 degrees in the trailing few inches of the blade, to transfer the deceleration energy of the saw into cutting action. The described configuration is achievable in a variety of saw blades each of which when assembled with a handle arrangement provides a saw with unusually smooth starting and fast cutting action, and all with minimal muscular effort and fatigue.

Figure 1:
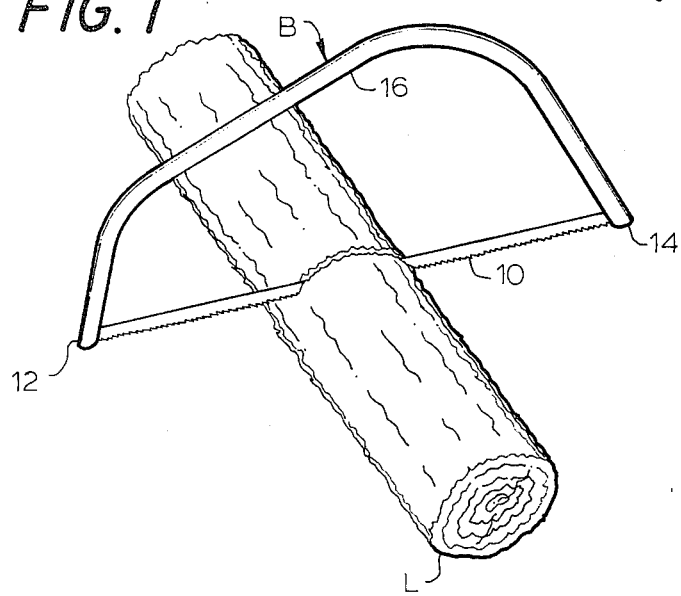
FIG. 1 is a perspective view of a bow saw employing a blade according to the invention.

With reference now to the drawings in detail, in FIG. 1 there is shown sawing a workpiece log L a bow saw B comprised of a saw blade 10 according to the invention, supported in tensioned relation by terminals 12, 14 of the bow 16. Saw blades 20 and 30 shown in FIGS. 2 and 3, respectively, and to be more particularly described hereinafter, illustrate one form of blade mounting structure in the form of holes 18 adapted to receive fasteners which are themselves not shown. In this manner the blades 10, 20, or 30 can be mounted in a bow such as the bow 16. It is further to be noted here that the bow 16 is but one form of handle defining blade support, with the blades of the invention being capable of mounting permanently or removably in a wide variety of saw types, the general type being generically known as a reciprocating saw of FIGS. 5, 6 and 7.

Figure 3:
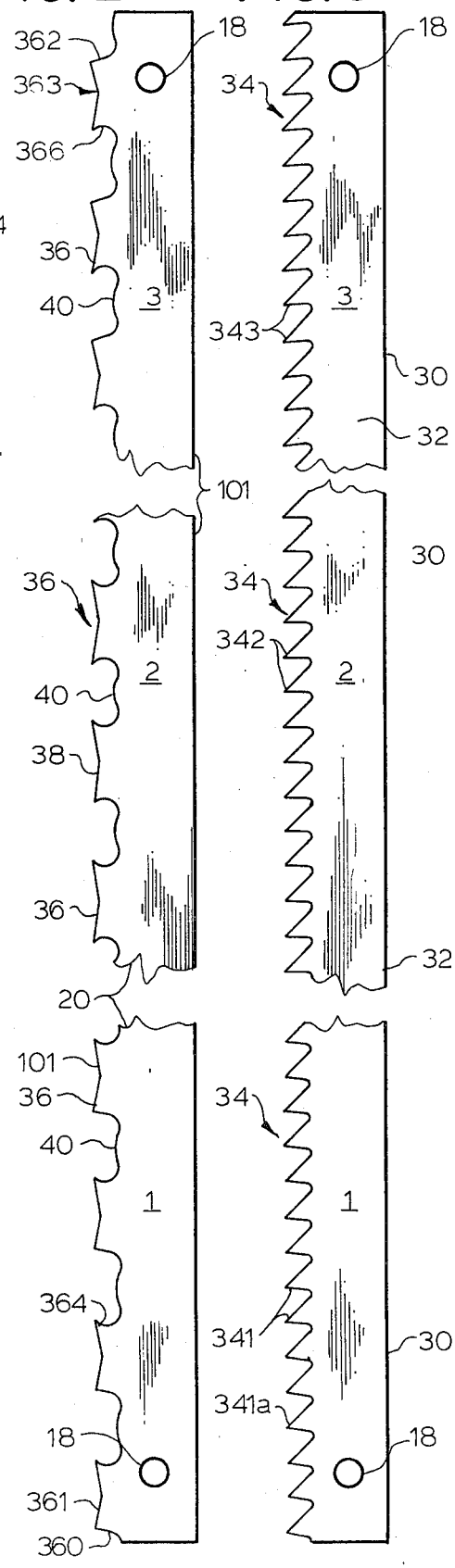
FIG. 3 is an enlarged fragmentary view of a further embodiment of the present invention.

With reference now to FIG. 3 in particular, the saw blade 30 has a cutting edge 32 comprising a plurality of longitudinally aligned teeth 34. The blade 30 is typically comprised of three sections, a first leading section denominated 1 in the drawing constitutes about 25% of the overall length of the blade. Section 1 appears at the bottom of FIG. 3 and it will be observed has teeth 341 which are sloped rearwardly or have a negative rake with reference to the blade 30. These teeth are raked at about a −3 degrees at the first or end tooth 341a and are raked less as the tooth progression moves toward the center of the blade 30. The teeth 341 in blade section 1 are particularly adapted to easy startup of a blade stroke, although they are not as aggressive in cutting for a given amount of muscle effort.

The blade 30 has a middle, second section 2, generally constituting about 50% of the overall blade length. Blade section 2 has teeth 342 which have a positive rake angle, that is a rake angle not less than 0, and generally not more than 10 degrees.

The blade 30 has a third trailing section 3, generally constituting about 25% of the overall blade length. Blade section 3 has teeth 343 which have a positive rake angle, up to about 15 degrees being preferred. The positive rake angle teeth 342, 343 are more efficient in cutting owing to their inherent tendency to dig into the workpiece, but they are hard starting for the same reason. The present saw blade utilizes the inherent strengths of both negative and positive rake angle teeth, while avoiding substantially the problems of either. The key to this result is the progressive change in rake angle from leading to trailing ends of the blade considered from the standpoint of the saw user. Thus the difficulty in startup is related to the absence of appreciable speed, and the energy expended in realizing speed of blade movement is necessarily counteracted by further energy expenditure in slowing the saw down at the end of a stroke, whereby all energy input is not consumed in overcoming friction. The present saw blade provides in its first (leading) section 1 negatively rake angled teeth 341 so it it is easy starting, and in its second and third sections 2, 3 (trailing) positive rake angle teeth which move easily with high cutting efficiency once started, and finally progressing to a final positive rake level at which blade speed is effectively translated into cutting energy, simultaneously reducing saw speed with relatively little muscle energy involved, and increasing rapidly the depth of the kerf.

In general, the desired result is realized where the rake angle of the first leading end tooth 341 is not more than −3 degrees in rake angle, and in which the rake angle of successive teeth 342, 343 changes progressively to not less than +5 degrees, the preferred rate of change in the positive rake direction (section 1 to section 3) being not greater than 1 degree. Additionally the positive rake angle at the trailing end of the blade (section 3) is preferably greater than the positive rake angle at the midpoint of the blade (section 2).

Figure 4:
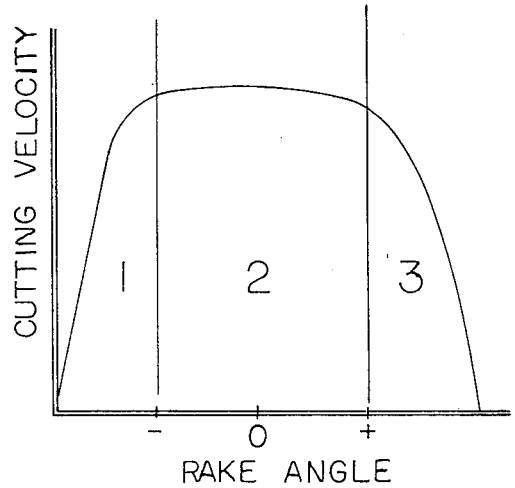
FIG. 4 is a graphical depiction of cutting velocity versus rake angle progression over the saw blade according to the invention.

In FIG. 4 the net effect of tooth rake angle on the velocity of a reciprocating saw blade is clearly illustrated. When the sawing force applied is generally constant, which is the case with the limited strength and energy applied to the operation of a hand saw, the factor controlling cutting velocity is the individual tooth rake angle. In FIG. 4 Section 1 represents the leading end of the saw blade according to the invention, where the tooth rake angle is negative. The saw starts easily and with a continuing constant applied force achieves a maximum velocity in approximately the first 25% of the blade length. In the Section 2 shown the acceleration has ceased, and the continuing applied force acts on teeth that are near 0 rake in the central 50% of the blade length, which produces nearly constant velocity for a constant force. In Section 3 shown the individual tooth rake angle changes to a maximum positive rake, with each successive tooth taking a more aggressive cut, thereby decelerating the blade in the trailing 25% of its length. In normal manual cutting the applied force diminishes near the end of stroke, and the kinetic energy carries the stroke to its conclusion. According to the invention, more of the energy is converted to cutting work which decelerates the blade near the end of stroke. This not only improves the working efficiency, but also allows the application of normal cutting force for a longer portion of the stroke, producing more cutting action per saw stroke. Tests conducted by the inventor have shown that the tooth rake angle distribution shown in FIG. 3 operates generally as illustrated in FIG. 4 to produce increased cutting efficiencies of as much as 50% as compared to prior art saws.

Figure 2:
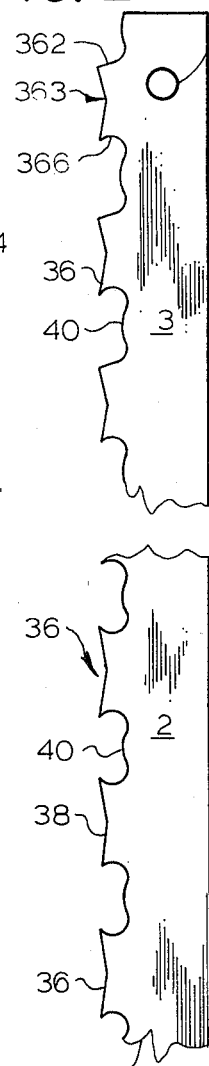
FIG. 2 is an enlarged fragmentary view of one form of saw blade according to the invention.

Turning now to FIG. 2, there is shown a special form of blade according to the invention. More particularly, the blade 20 has a longitudinal series of teeth 36, each of which is configured to have two points, i.e., be bicuspid, with a valley shaped notch 38 therebetween. Each of the adjacent teeth 36 are separated by a smaller single point tooth 40. The tooth pattern of the FIG. 2 blade 20 provides a negative rake on edge 360 of the first tooth 361 at the leading end of the blade when starting the stroke in Section 1, and a negative rake on edge 362 of the first tooth 363 at the leading end of the blade when starting the stroke in Section 3. A positive rake angle is simultaneously provided on these same teeth 361, 363, at edges 364, 366. In this embodiment, when the stroke direction is through Sections 1, 2 and 3 successively, the leading edge rake angle on each tooth is essentially the same as shown in the saw blade of FIG. 3. Also when the stroke direction is reversed for the same blade of FIG. 2, when the stroke direction is through Sections 3, 2, and 1 successively, the leading edge rake angle on each tooth is again the same. The blade operates then with a reciprocating stroke which cuts identically in both directions of stroke, wherein the leading 25% of the blade has negative rake on the leading tooth edges, the central 50% of the blade has approximately 0 rake angle on the leading tooth edges, and the trailing 25% of the blade has positive rake angle on the leading tooth edges. Since the principal cutting teeth are bicuspid, the leading edges of the teeth are also those towards the direction of motion.

Figure 5:
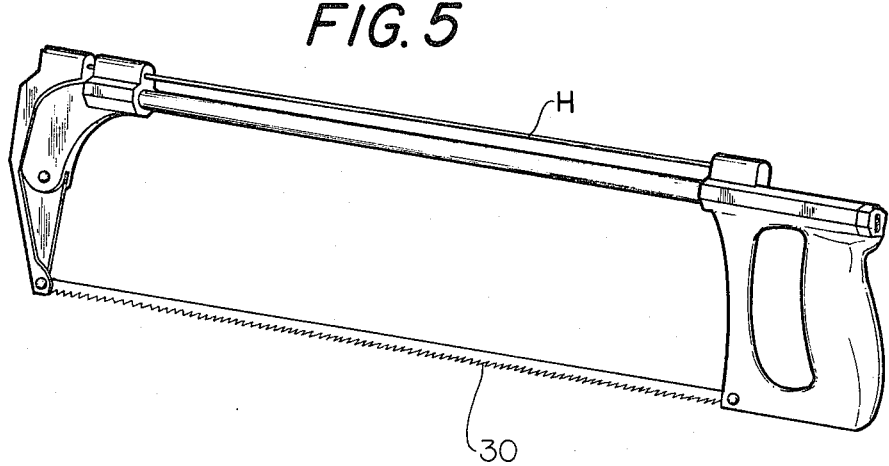
FIG. 5 is a perspective view of a hacksaw provided with a blade according to the invention.
Figure 6:
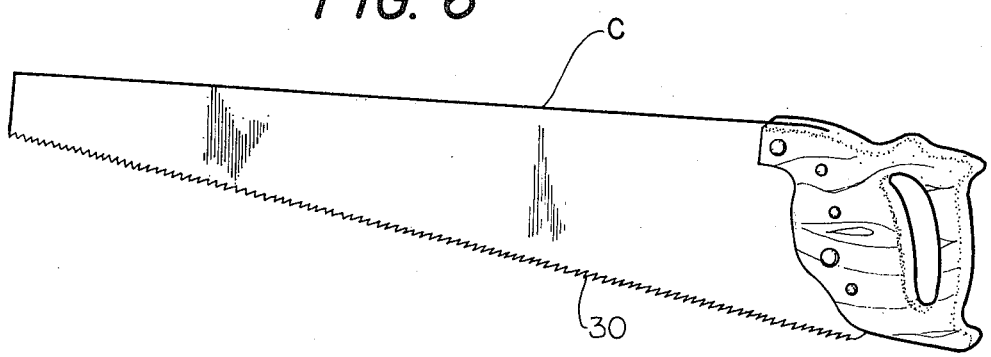
FIG. 6 is a view like FIG. 5, and of a carpenter's saw provided with a blade according to the invention.
Figure 7:
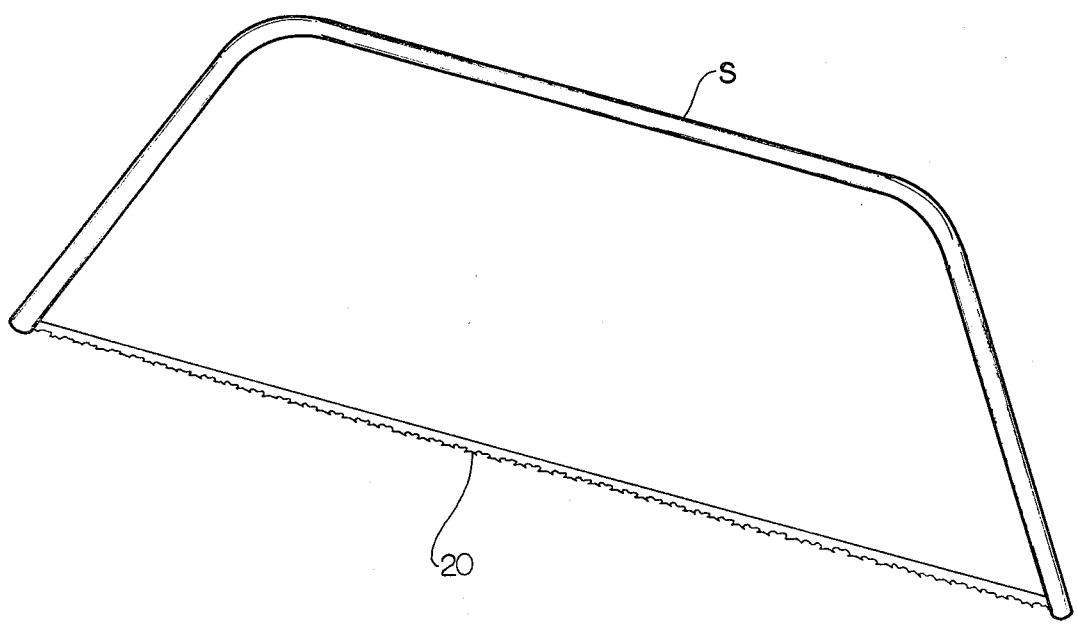
FIG. 7 is a view like FIG. 5, and of an additional bow saw provided with a blade according to the invention.

In FIGS. 5, 6 and 7, other saw structures i.e. a hacksaw H, a carpenter's saw C and a bow saw S respectively are depicted, the former two with blade teeth like those shown in FIG. 3, and the third with blade teeth like those shown in FIG. 2.

There is thus provided an improved form of saw blade for a reciprocal saw.

I claim:

1. In a blade for a reciprocating saw having a cutting edge comprising a plurality of longitudinally aligned teeth, the improvement comprising said teeth having a negative rake angle near the leading end of the blade for reducing needed force for cutting at the beginning of a cutting stroke, increasing rake angle from the leading end of the blade including a transition through zero rake angle in the intermediate region of the blade, and a positive rake angle near the trailing end of the blade for increasing the force necessary for cutting toward the end of a cutting stroke to decelerate the saw during or at the end of a stroke, whereby cutting actions are related to expected blade speed at any given point on the saw and relatively constant muscular effort is required over the length of a stroke.

2. A blade for a reciprocating saw, said blade having a cutting edge comprising a plurality of longitudinally aligned teeth, said blade having successive first, second and third cutting zones; the first said zone comprising substantially 25% of the blade length, the second said zone comprising substantially 50% of the blade length, and the third zone comprising of substantially 25% of the blade length; the teeth in the first said cutting zone having a negative rake angle, the teeth in the said second cutting zone having a positive rake angle greater than 0 degrees and not more than 10 degrees, and the teeth in the third cutting zone having a positive rake angle of more than 10 degrees; there being a gradual tooth-to-tooth progressive variation from negative to positive rake angle along substantially the entire length of the saw blade from leading to trailing ends of the blade, such tooth-to-tooth progressive variation being greater than 0 degrees but less than 1 degree.

3. The saw blade according to claim 1 or 2, in which the rake angle of the first leading end tooth is not more than −3 degrees, and in which the rake angle of successive teeth changes progressively to not less than +5 degrees within the first half of the blade length.

4. The saw blade according to claim 1, in which:
   the negative rake angle of the leading end tooth is not more than −3 degrees;
   the positive rake angle of the teeth on the trailing half of the blade is not less than +5 degrees; and
   the tooth-to-tooth progression in the positive rake direction is not greater than 1 degree.

5. The saw blade according to claim 4, in which the positive rake angle at the trailing end of the blade is greater than the positive rake angle at the midpoint of the blade.

6. The saw blade according to claim 1 or 2, in which each tooth has two points, said points being spaced by a notch, the blade being generally symmetrical about its longitudinal midpoint, and the leading edges of said teeth having a negative rake angle in either use direction, for reduced effort stroking in either direction.

7. The saw blade according to claim 6, in which the two pointed teeth are separated by one or more single point teeth along the linear extent of said blade.

* * * * *